US008167336B2

(12) United States Patent
Minor et al.

(10) Patent No.: US 8,167,336 B2
(45) Date of Patent: May 1, 2012

(54) IDENTIFICATION LABELS AND METHODS OF USING THE SAME

(75) Inventors: Rick Minor, Barrie (CA); Robert Leonard, Stirling (CA)

(73) Assignee: Moore Wallace North America, Inc., Stamford, CT (US)

( * ) Notice: Subject to any disclaimer, the term of this patent is extended or adjusted under 35 U.S.C. 154(b) by 756 days.

(21) Appl. No.: 11/756,174

(22) Filed: May 31, 2007

(65) Prior Publication Data

US 2008/0296886 A1 Dec. 4, 2008

(51) Int. Cl.
*B42D 15/00* (2006.01)
*G09C 3/00* (2006.01)
*G09F 3/20* (2006.01)
*G09F 3/04* (2006.01)
*G09F 3/10* (2006.01)

(52) U.S. Cl. .................. 283/80; 283/81; 283/103; 40/6; 40/630

(58) Field of Classification Search .................... 283/72, 283/74, 80, 81, 94, 101, 103, 105; 40/626, 40/630, 6; 428/43
See application file for complete search history.

(56) References Cited

U.S. PATENT DOCUMENTS

| | | | | |
|---|---|---|---|---|
| 3,228,129 | A | 1/1966 | Gwinn et al. | |
| 3,994,085 | A | 11/1976 | Grosselak et al. | |
| 4,631,845 | A | 12/1986 | Samuel et al. | |
| 4,726,131 | A | 2/1988 | Cass | |
| 4,882,861 | A | 11/1989 | Holmes et al. | |
| 4,947,567 | A | 8/1990 | Hermann | |
| 5,145,211 | A | 9/1992 | McKillip | |
| 5,207,458 | A | 5/1993 | Treichel et al. | |
| 5,357,702 | A | 10/1994 | Van Tuil et al. | |
| 5,468,231 | A * | 11/1995 | Newman et al. | 283/101 |
| 5,884,425 | A | 3/1999 | Baldwin | |
| 6,295,747 | B1 | 10/2001 | Francis | |
| 6,303,201 | B1 * | 10/2001 | Baierl et al. | 428/40.1 |
| 6,413,604 | B1 | 7/2002 | Matthews et al. | |
| 6,490,821 | B1 | 12/2002 | Lacek | |

FOREIGN PATENT DOCUMENTS

EP 325515 A 7/1989

OTHER PUBLICATIONS

Canadian Intellectual Property Office, "Office Action," issued in connection with Canadian application serial No. 2,590,941, mailed on Jul. 26, 2010, 2 pages.
Canadian Intellectual Property Office, "Office Action," issued in connection with Canadian application serial No. 2,590,941, mailed on Apr. 11, 2011, 2 pages.

* cited by examiner

*Primary Examiner* — Dana Ross
*Assistant Examiner* — Kyle Grabowski
(74) *Attorney, Agent, or Firm* — Hanley, Flight & Zimmerman, LLC

(57) ABSTRACT

Labels and methods for removing a portion of a release liner from a label are disclosed. An example labels includes a substrate, a layer of adhesive on the substrate, a layer of release coating in contact with the layer of adhesive, and a release line in contact with the release coating. The release liner includes a first edge, a second edge, and a first line of weakness. The first line of weakness includes a tapered or curved portion and extends from the first edge of the release liner to between the first edge and the second edge of the release liner.

6 Claims, 4 Drawing Sheets

IDENTIFICATION LABELS AND METHODS OF USING THE SAME

FIELD OF THE DISCLOSURE

The present disclosure relates generally to multi-layer forms and, more particularly, to identification labels and methods of using the same.

BACKGROUND

Adhesive-backed identification labels have been used in the airline industry to identify an owner of a bag and a destination city. A known identification label 100 is shown in FIGS. 1 and 2. Prior to applying the label 100 to a piece of luggage, a passenger or ticketing agent pulls a backing liner tab 102 to remove the backing liner tab 102 and expose an area of adhesive 104. Typically, conventional identification tags include a full perforation 106 across the entire backing liner tab 102. The full perforation 106 forms a point at which the backing liner tab 102 is designed to separate from the remainder of the backing liner 108 and the label 100.

Often, a passenger rushes to make a flight and/or a ticketing agent is pressured to quickly process each passenger to help passengers make their flights, ensure luggage is delivered to the correct flights, reduce wait times, etc. During such haste, the passenger or ticketing agent may quickly pull the backing liner tab 102 without ensuring that the backing liner tab 102 rips at the full perforation 106. Consequently, the backing liner tab 102 does not detach at the full perforation 106, and the remainder of the backing liner 108 continues to detach to completely separate the label 100 or otherwise expose more of the adhesive 104 than intended.

If too much adhesive 104 is exposed, the label 100 may inadvertently become adhered to surfaces, including folding over upon itself in a manner that causes the label 100 to become very wrinkled such that bar codes or other identifying information that appears on a surface 110 of the label 100 is no longer machine- or human-readable. Further, any attempt by the passenger or ticketing agent to reattach or otherwise fix the label 100 may result in further damage to the label 100, often to the point that the label 100 is ruined entirely. Consequently, in addition to wasted material and costs associated therewith, the passenger and ticketing agent may have to take the time to reprint and attach an additional label.

DETAILED DESCRIPTION

Figure 1:
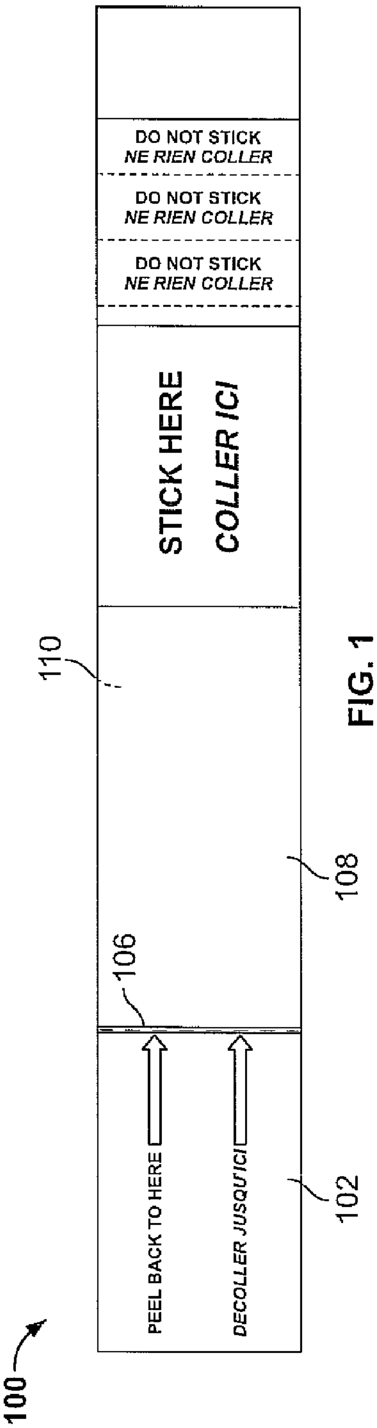
FIG. 1 (Prior Art)
FIG. 1 depicts a known a prior art identification label prior to separation of a backing liner.
Figure 2:
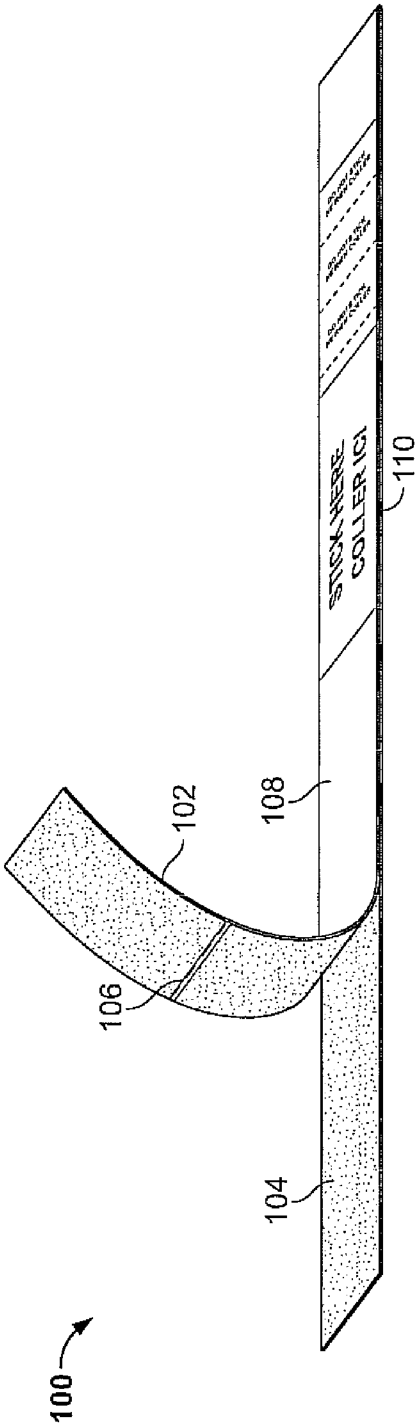
FIG. 2 (Prior Art)
FIG. 2 depicts the known label of FIG. 1 with the backing liner partially removed or separated from the identification label.
Figure 3:
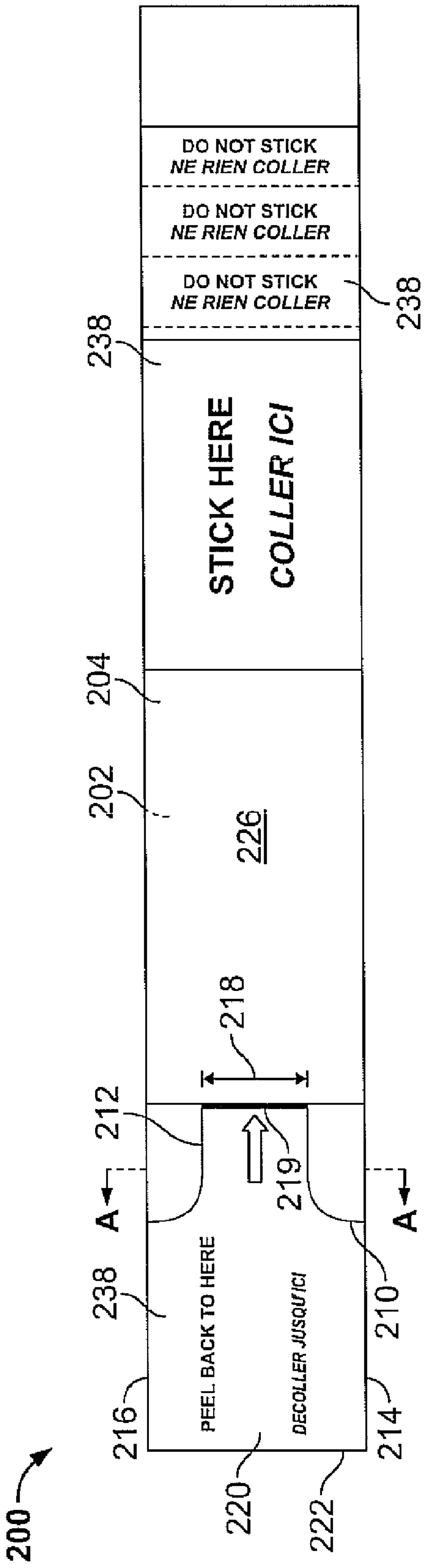
FIG. 3 depicts an example identification label prior to removal or separation of a portion of a release liner.

This description relates generally to an example label that, for example, may be used as a baggage identification tag in connection with travel. The example label described herein includes a substrate, a layer of adhesive on the substrate, a layer of release coating in contact with the layer of adhesive, and a release liner. The release liner includes a first edge, a second edge opposite the first edge, and a first line of weakness. A portion of the first line of weakness is tapered or curved and extends from the first edge of the release liner to between the first edge and the second edge of the release liner. In some examples, when the release liner is removed, the first line of weakness causes the release liner to tear so that a portion of the release liner remains with the label.

FIGS. 3-7 illustrate an example label 200. The example label 200 includes a substrate 202 (FIG. 3) and a backing or release liner 204, which may be made from an easily tearable material. In the example, one side of the substrate 202 is at least partially coated, with an adhesive layer 206. In addition, a release coating layer 208 is disposed between the release liner 204 and the adhesive 206.

The example label 200 also includes a first line of weakness 210 and a second line of weakness 212, though in some examples there may be only one line of weakness. The lines of weakness 210 and 212 may be implemented using a cut, a score, a fold, a perforation, or any other type of fault that may be used to facilitate the separation of a portion of the release liner 204, as described in greater detail below. The lines of weakness 210 and 212 may extend through the release liner 204 and one or more of the release coating layer 208 and the adhesive layer 206.

The release liner 204 includes a first edge 214 and a second edge 216. The first line of weakness 210 extends from the first edge 214 of the release liner 204 to between the first edge 214 and the second edge 216. Similarly, the second line of weakness 212 extends from the second edge 216 to between the second edge 216 and the first edge 214. A least a portion of each of the first and second lines of weakness 210 and 212 is tapered or curved so that at least portions of the lines of weakness 210 and 212 converge inwardly toward one another and/or a centered portion of the label 200. In some examples where there is one line of weakness, the line of weakness may converge with an edge of the liner 204. The lines of weakness 210 and 212 may be tapered in a variety of ways including via an inwardly curving path, a diagonal or rectilinear path, or any other path causing at least portions of the lines of weakness 210 and 212 to either tear across the release liner 204 and/or to converge inwardly toward a central portion of the label 200.

In the illustrated example, the first and second lines of weakness 210 and 212 are separated by a distance 218. The distance 218 between the lines of weakness 210 and 212 may be spanned by a third line of weakness 219 that may be any of a cut, a score, a fold, a perforation, or any other type of fault that may be used to facilitate the separation of a portion of the release liner 204. Alternatively, the distance 218 may not be spanned by a line of weakness at all but, rather, an unmodified portion of the release liner 204. In yet other examples, the distance 218 between the lines of weakness 210 and 212 may not be present if the first and second lines of weakness 210 and 212 meet, for example, at a point.

A removable tab 220 is formed within the release liner 204. In the illustrated example, the removable tab 220 is defined by the first edge 214, the second edge 216, the first line of weakness 210, the second line of weakness 212, the line of weakness 219 or the distance 218 and an end 222 of the label and an end of the tab 225. To adhere the label 200 to an object 224 such as, for example, a piece of luggage, a stroller, an animal carrier, a bag of skis or golf clubs, etc., a passenger, ticketing agent, gate agent, or other person removes the removable tab 220 of the release liner 204 to separate the removable tab 220 from the substrate 202 by overcoming the adhesive bond between the substrate 202 and the removable tab 220 release liner 202 or the adhesive bond between the adhesive layer 206 and the release coating 208.

As the removable tab 220 is pulled and separated from the substrate 202, the first and second lines of weakness 210 and 212 cause edges 221 and 223 of the removable tab 220 to curve or converge inwardly from the edges 214 and 216 and toward a middle central portion 226 of the release liner 204. By causing the edge 221 and 223 of the removable tab 220 to curve or converge inwardly, the first and second lines of weakness 210 and 212 facilitate a break (or separation of the removable tab 220 from the substrate 202) at the line of weakness 219 or the distance 218.

Figure 4:
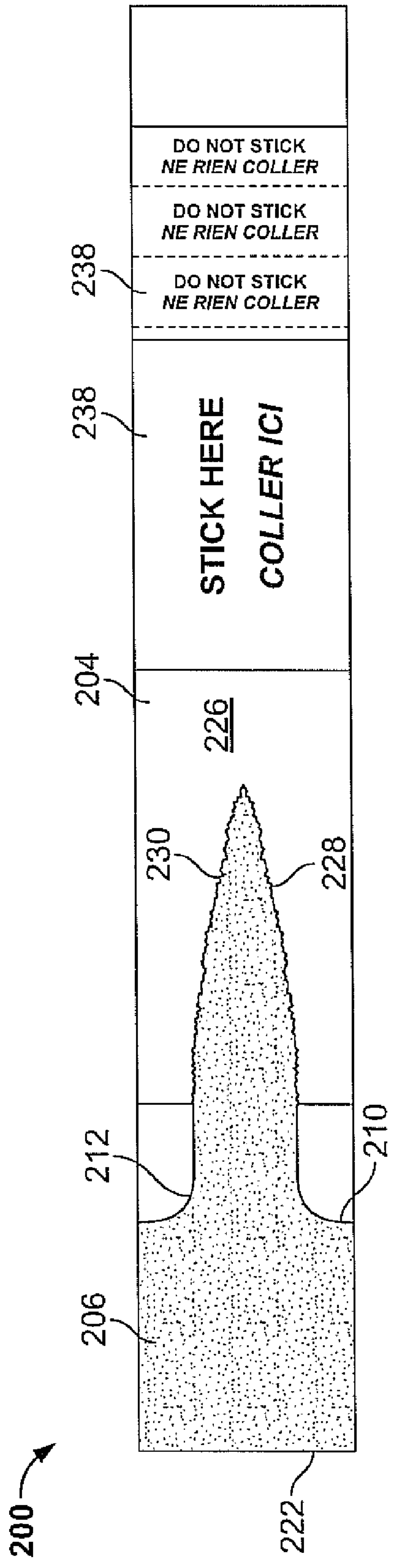
FIG. 4 depicts the example identification label of FIG. 3 after the portion of the release liner has been removed or separated.
Figure 5:
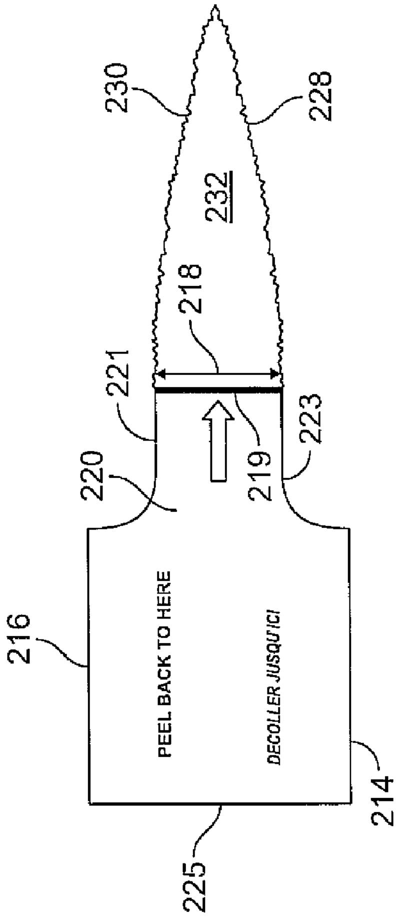
FIG. 5 depicts the portion of the release liner removed from the example identification label shown in FIG. 4.
Figure 6:
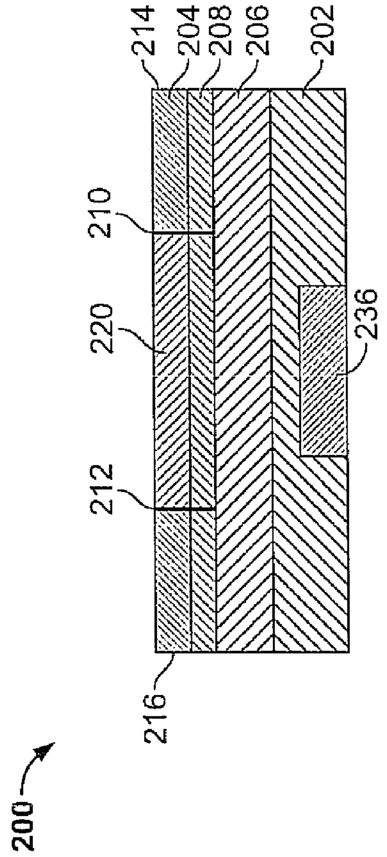
FIG. 6 is a cross-sectional view of the example label of FIG. 3 taken along the A-A line.
Figure 7:
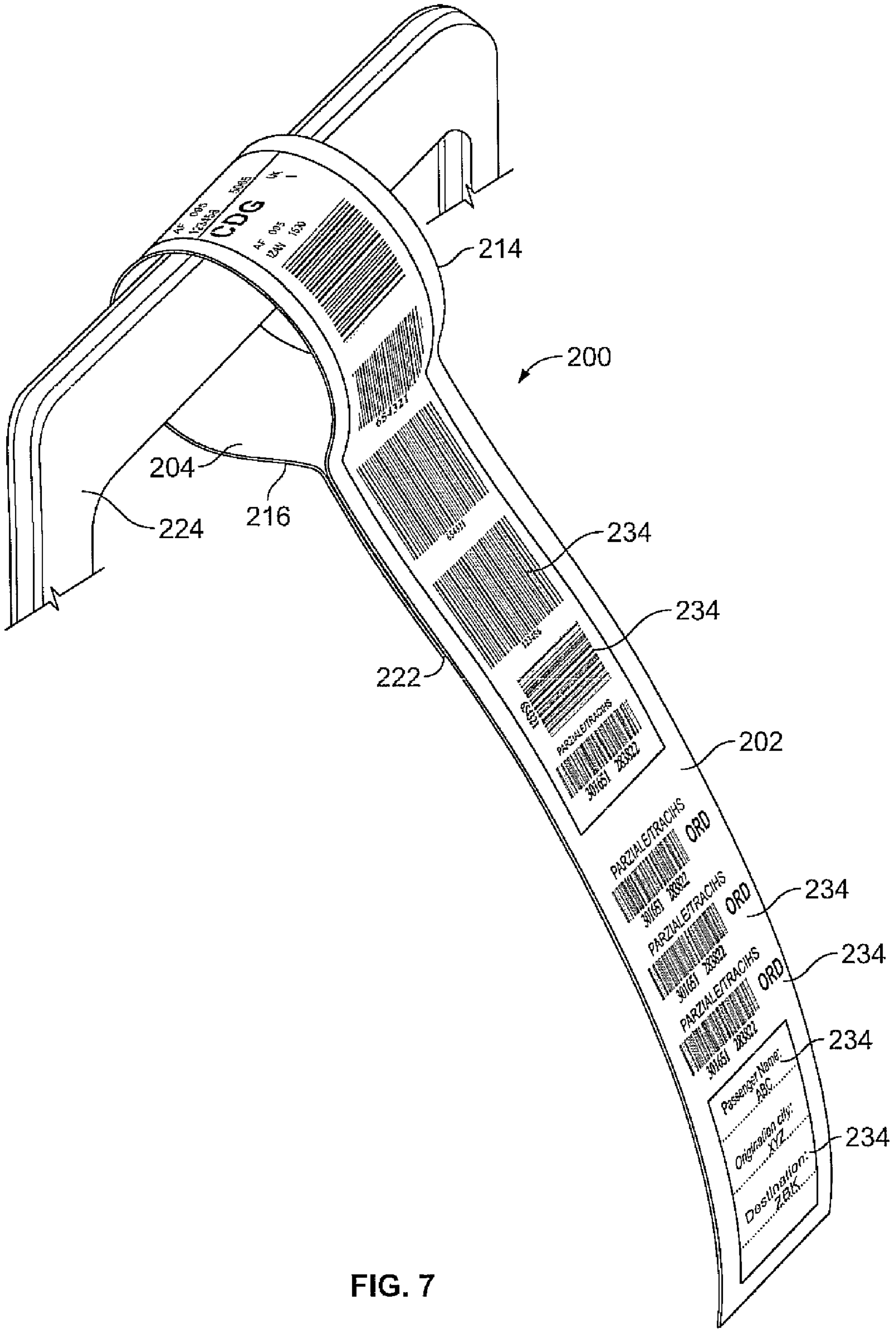
FIG. 7 depicts the example identification label of FIG. 4 adhered around a handle.

In one example, the removable tab 220 is separated from the substrate 202 and the remainder of the label 200 via an edge defined by the line of weakness 219 spanning the distance 218. In particular, the end 225 of the tab 220 is peeled back from the substrate 202 and is pulled toward the line of weakness 219. When the tab 220 is separated from the substrate 202 up to the line of weakness 219, the tab 220 may separate from the remainder of the release liner 204 at the lines of weakness 219 (i.e., the release liner 204 may be severed at or about the line of weakness 219). However, if the liner 204 fails to separate at the line of weakness 219 (e.g., due to a line of weakness 219 being insufficient to enable such separation or the absence of the line of weakness either intentionally or as a result of a manufacturing defect), then the liner 204 may tear along converging tear lines 228 and 230 as the tab 220 is pulled further. As depicted in FIG. 4, the tear lines 228 and 230 converge toward a central portion 226 of the liner 204, and when the tear lines 228 and 230 meet, the tab 220, including a triangularly-shaped tail portion 232 can be separate from the remainder of the liner 204.

The removable tab 220 along with a tail 232 of material from the middle 226 of the release liner 204 are separated from the substrate 202 and may be discarded, recycled, etc. In addition, the tab 220 may be used, for example, as a baggage claim stub or otherwise as a source of information for the passenger.

The side of the substrate 202 of the label 200 opposite from the release liner 204 includes one or more pieces of information 234. The information 234 may include travel information such as one or more of flight information, passenger information, baggage information, an origin of a journey of a passenger, a destination of a passenger, information regarding a security status for a passenger and/or the object to which the label is coupled, and other information. In addition, the information 234 may appear in one language or multiple languages. Further, the information 234 may appear as human readable information and/or machine readable information such as for example, a bar code. Finally, the information 234 may be embedded into or coupled to the substrate 202 as a radio frequency identification (RFID) tag 236 without requiring any written indicia of the information to appear on a surface of the substrate.

The release liner 204 may also include information such as, for example, instructions 238. Similar to the information 234 on the substrate, the information or instructions 238 may be a variety of information, appear in one or more languages, etc.

After the removable tab 220 has been removed, the label 200 may be coupled to an object such as, for example, the handle 224 of a piece of luggage. In the illustrated example shown in FIG. 7, the label 200 is folded or looped over itself so that at least a portion of the adhesive 206 is positioned opposite a portion of the release liner 204 on the side of the release liner 204 opposite the release coating 208. Pressure is added to couple the adhesive 206 and the release liner 204 to secure the label 200 to the desired object.

In an alternative example (not shown), once the removable tab 220 has been separated from the substrate 202, the label 200 may be coupled to an object by facing the exposed adhesive 206 toward a surface of the object. Pressure is added to couple the adhesive 206 to the object to secure the label 200 to the desired object.

Because only the removable tab 220 and the tail 232 are removed from the substrate 202, an excessive amount of the adhesive layer 206 is not exposed. Thus, the label 200 may be manipulated and otherwise handled and remain substantially flat without becoming unintentionally or inadvertently adhered to itself, an unintended part of an object, or an unintended object. In addition, the information on the label 200 does not become obscured, destroyed or otherwise illegible by either a human and/or a machine.

Although certain example methods and apparatus have been described herein, the scope of coverage of this patent is not limited thereto. On the contrary, this patent covers all methods, apparatus and articles of manufacture fairly falling within the scope of the appended claims either literally or under the doctrine of equivalents.

What is claimed is:

1. A method of removing a portion of a release liner from a label comprising:

pulling an end of the release liner away from a substrate of the label to overcome an adhesive bond between the release liner and the substrate and to cause the release liner to separate along a first tapered or curved line of weakness having a first end and a second end, the first end intersecting with a first edge of the release liner and the second end substantially orthogonally coupled to a score and to separate along a second tapered or curved line of weakness having a third end and a fourth end, the third end intersecting with a second edge of the release liner and the fourth end substantially orthogonally coupled to the score;

tearing the release liner by exerting pulling force between the release liner and the substrate to tear past the second end of the first line of weakness, the fourth end of the second line of weakness and the score triangularly so that only a portion of the release liner is separated from the substrate;

tearing the release liner further to cause a first tear line extending from the second end of the first line of weakness to converge with a second tear line extending from the fourth end of the second line of weakness; and removing the portion of the release liner from the label once the first tear line and the second tear line converge.

2. A method as defined in claim 1 further comprising printing travel information on the removable portion and the label.

3. A method as defined in claim 1 further comprising providing the removable portion to a passenger as a baggage claim ticket.

4. A method as defined in claim 1 further comprising securing the label to a luggage piece once the removable portion has been removed.

5. A method as defined in claim 4 further comprising wrapping a first end of the label around to meet a second end of the label to form a loop, wherein the removable portion was removed from the first end and the second end is coupled to the first end in a space vacated by the removable portion.

6. A method as defined in claim 5 wherein the second end is a middle portion of the label.

* * * * *